March 9, 1937. C. W. SCHROEDER Re. 20,288

ELECTRIC COOKING DEVICE

Original Filed Oct. 25, 1934

Inventor:
Clarence W. Schroeder,
by Harry E. Dunham
His Attorney.

Reissued Mar. 9, 1937

Re. 20,288

UNITED STATES PATENT OFFICE 20,288

ELECTRIC COOKING DEVICE

Clarence W. Schroeder, Cicero, Ill., assignor to Edison General Electric Appliance Company, Inc., Chicago, Ill., a corporation of New York Original No. 2,046,973, dated July 7, 1936, Serial No. 749,931, October 25, 1934. Application for reissue November 10, 1936, Serial No. 110,096

6 Claims. (Cl. 53—5)

This invention relates to electric cooking devices, more particularly to hot-plates or griddles, such as are used for frying, baking pancakes and like cooking operations, and it has for its object the provision of an improved device of this character.

This invention is particularly applicable to electrically heated griddles which are provided with plane cooking surfaces, such for example as that described and claimed in the United States patent to Jacob L. Shroyer, No. 1,717,270, dated June 11, 1929. As there described, this griddle comprises an electrically heated plane cooking surface surrounded by a trough for draining away grease, juices and other liquids that flow from the cooking surface while edibles are being cooked.

Griddles of this type are being used more and more for the miscellaneous cooking of foods and for many cooking operations of the "short order" type, and have proven to be satisfactory in general. However, they have been somewhat limited in their application, because it is impossible to pile up much food upon the cooking surface without danger of the food falling off, and because of the danger of smaller quantities of food falling off when they are being handled by implements for turning, etc. These disadvantages become increasingly troublesome when the griddle is used on shipboard, because there is the tendency for even relatively small quantities of food to slide off of the cooking surface as the ship rolls and pitches.

This invention contemplates the provision of an improved griddle whereby the above-mentioned disadvantages are obviated, and the uses and functions of the griddle thereby extended.

In accordance with this invention, the griddle is provided with an auxiliary detachable flange-like guard which is arranged to be fitted to the periphery of the cooking surface so as to give depth to the griddle, whereby considerable quantities of food-stuffs can be piled up on the griddle, and can be manipulated and turned without danger of food sliding off of the cooking surface. The guard is provided with a seat that rests loosely upon the peripheral edge of the cooking surface so as to permit grease, juices, etc. arising in the cooking operations to flow freely into the trough surrounding the cooking surface.

Figure 1:
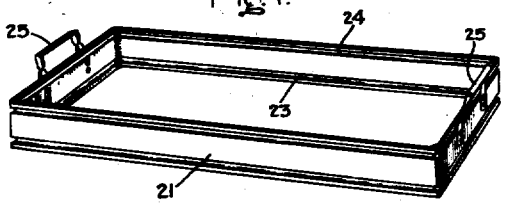
Figure 3:
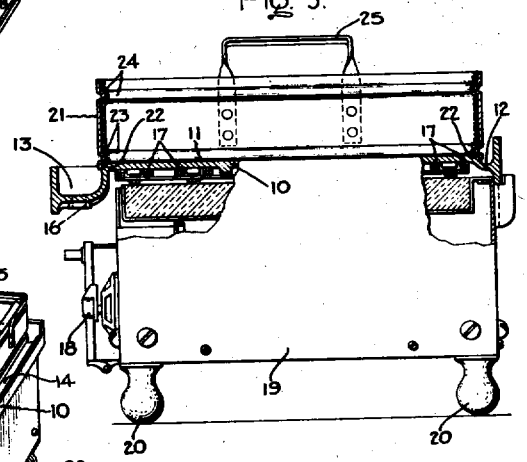
Figure 2:
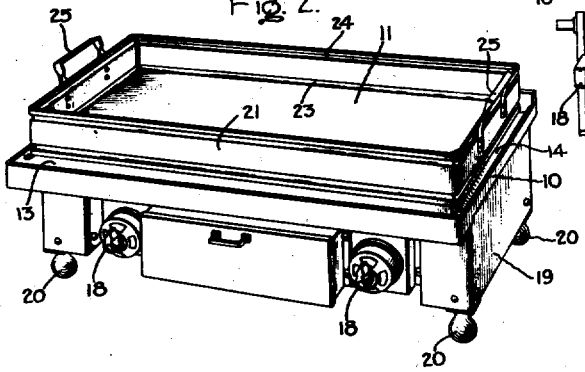
Figure 4:
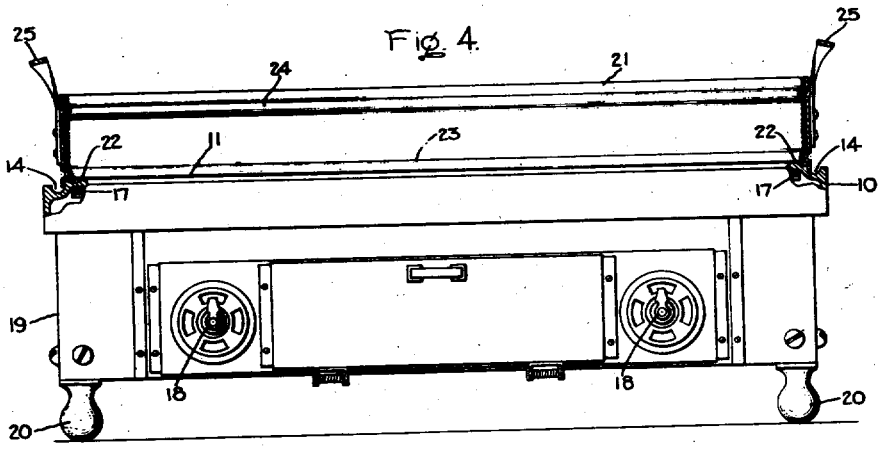

For a more complete understanding of this invention, reference should be had to the accompanying drawing in which Fig. 1 is a perspective view of a flange-like guard intended to be applied to the electrically heated griddle shown in Figs. 2, 3 and 4; Fig. 2 is a perspective view of an electric griddle with the flange guard of Fig. 1 applied to the griddle; Fig. 3 is an enlarged end elevation of the griddle shown in Fig. 2, portions being shown in section and portions being broken away so as to illustrate certain details of construction; and Fig. 4 is a front elevation of the griddle of Figs. 2 and 3 with portions broken away and other portions shown in section so as to illustrate certain details of construction.

Referring to the drawing, this invention has been shown in one form as applied to an electric griddle of the type described and claimed in the above-mentioned Shroyer Patent No. 1,717,270. As shown in Figs. 2, 3 and 4, this griddle comprises a cooking plate 10 having an upper flat plane cooking surface 11 of rectangular form. It will be understood that the cooking surface may have any other suitable form; thus it may be square, or it may be round. The plate 10 will be formed of any suitable metal, such as cast-iron. The cooking plate is provided at the rear with a relatively shallow trough 12 and at the front with a deeper trough 13 which is connected at its ends with the ends of the trough at the rear by means of a pair of troughs 14 arranged at the ends of the cooking surface, as clearly shown in Figs. 2, 3 and 4. It will be observed that the troughs 12, 13 and 14 together form a peripheral trough surrounding the cooking surface, which is arranged to drain away from the cooking surface juices, grease and other liquids arising during the cooking operations. The back and end troughs drain into the front trough from which the liquids drain through an aperture 16 under which a suitable receptacle may be placed.

The cooking surface 11 is heated by suitable electrical heating elements 17 positioned beneath the plate and arranged so as to distribute heat over substantially the entire cooking surface 11, as described in more detail in the above-mentioned Shroyer patent. The heating units are arranged in pairs, as described in this patent, each pair being arranged to apply heat to the two end halves respectively of the cooking surface. Each pair of heating elements is controlled by means of a suitable rotary switch 18 which is arranged to control the associated elements to provide "low", "medium" and "high" heats.

The cooking plate 10, together with its heating elements 17, and their controlling switches 18 are supported by means of a suitable rectangular casing 19 which in turn is supported upon suitable feet 20.

As pointed out previously, it is not possible in the griddle thus far described to place upon the cooking surface 11 large quantities of food stuffs because it is quite likely that the food would fall off the cooking surface into the channel surrounding the surface, especially when the food is being manipulated for turning and distributing it over the cooking surface. When the griddle is applied to shipboard, where a considerable rolling and pitching movement is imparted to it, even small quantities of food stuff tend to slide off of the cooking surface. In accordance with this invention, these difficulties are overcome by providing a metallic flange-like guard member 21 which, as shown has the same contour as the peripheral edge of the cooking plate 10; that is, in the specific grill shown in Figs. 2, 3 and 4, the guard member 21 is given a rectangular shape. Preferably, the walls defining the guard member will be so arranged that when it is positioned upon the cooking surface 11, as shown in Figs. 2, 3 and 4, the walls will be substantially perpendicular to the cooking surface. It will be understood that if the cooking surface has a square, round or other shape, the guard member 21 will be given a corresponding shape.

On the lower edges of the walls of the guard member there is arranged a peripheral seat 22 which is arranged to rest upon and over the peripheral edge of the cooking surface 11, as shown in Figs. 3 and 4. The seat 22 may be formed in any suitable manner, but preferably will be formed by providing a bead 23 extending inwardly of the walls of the guard member, and preferably formed of these walls, as clearly shown in the drawing. A similarly inturned bead 24 is provided in the upper portions of the walls for the purpose of improving the appearance of the guard member and also to increase its rigidity. The seat 22 does not grip or firmly engage the peripheral edges of the cooking surface 11 so that greases, juices and other liquids that arise during the cooking operations can flow freely under or between the guard member and the adjacent portions of the cooking plate into the troughs 12, 13 and 14 surrounding the cooking surface.

The guard member is provided with a pair of handles 25 at its ends whereby it can be conveniently placed upon and withdrawn from the griddle.

It will be understood that in use, when the guard is not required, that is, when the griddle is not being moved about as with a ship as it rolls and pitches, and a relatively small quantity of food is being cooked, the auxiliary guard member may be removed from the griddle and the griddle used as it has been heretofore. However, if there are relatively large quantities of food to be cooked, such as a large quantity of potatoes to be fried, the guard member will be applied to the cooking plate, as shown in Figs. 2, 3 and 4, whereby the depth of the griddle is materially increased so that the large quantity of food stuff may be placed on the cooking surface without danger of it falling from the surface either because of its large quantity or when it is being manipulated so as to turn it. If the griddle is used on shipboard it is preferable to use the auxiliary guard most of the time, because, as pointed out previously, if the griddle is moved with the ship as it pitches and rolls, even relatively small quantities of food might possibly slip or fall from the cooking surface if the guard is not placed upon it.

It will be observed, that I have provided a very inexpensive and simple griddle that can be used for many applications to which griddles heretofore known have not been suited.

While I have shown a particular embodiment of my invention, it will be understood, of course, that I do not wish to be limited thereto since many modifications may be made, and I, therefore, contemplate by the appended claims to cover any such modifications as fall within the true spirit and scope of my invention.

What I claim as new and desire to secure by Letters Patent of the United States, is:

1. A griddle comprising a cooking plate having a peripheral trough surrounding it, the plate and trough being related so that grease and other liquids can drain away from the food being cooked on said surface into said trough, means for heating said plate, and a detachable flange arranged to be fitted to the periphery of said cooking plate so as to provide depth to said griddle, whereby food stuffs can be piled upon said cooking plate to a considerable depth without danger of sliding or falling from said plate, said flange having a loose fit with said cooking plate so that grease and other liquids can drain freely from said cooking plate to said trough.

2. An electric griddle comprising a metallic cooking plate having a plane cooking surface and a peripheral trough surrounding said cooking surface arranged to carry away grease and other liquids draining from the food being cooked on said surface, said trough being provided with a drain aperture through which grease and liquids in said trough can drain away therefrom, electric heating means in thermal relation with said cooking plate so as to apply heat to said cooking surface and an auxiliary, upright metallic guard open at its upper end and arranged to be fitted detachably to said plate so as to provide an upright marginal wall around said cooking surface, said guard having a loose fit with said cooking plate so that said grease and other liquids can drain freely from said cooking surface to said trough.

3. An electric griddle comprising a cooking plate having a plane cooking surface and a peripheral trough surrounding said cooking surface arranged to carry away grease and other liquids draining from the food being cooked on said cooking surface, electrical heating means arranged to heat said cooking surface and an auxiliary flange-like guard having a shape substantially the same as the contour of said cooking surface and having its upper end open and being provided on its lower edge with a seat arranged to be fitted over the peripheral edge of said surface whereby said guard is supported in an upright position on said surface to define a peripheral wall about it, said seat having a loose fit with said cooking plate so that said grease and other liquids can drain freely from said cooking surface to said trough.

4. A griddle comprising a cooking plate having a trough along an edge thereof, the plate and trough being related so that grease and other liquids can drain away from the food being cooked on said surface into said trough, means for heating said plate, and a detachable flange arranged to be fitted to said cooking plate so as to provide depth to said griddle, whereby food stuffs can be piled upon said cooking plate to a considerable depth without danger of sliding or falling from said plate, said flange having a loose fit with said cooking plate at said edge so that grease and other liquids can drain freely from said cooking plate to said trough.

5. A griddle comprising a cooking plate having a plane uninterrupted cooking surface, means for heating said cooking plate, a detachable flange arranged to be fitted to said cooking plate so as to provide depth to said cooking surface, whereby food stuffs can be piled thereon to a considerable depth without danger of sliding or falling from said plate, and means for draining grease and other liquids from said cooking surface while said flange is in operative position thereon.

6. In a griddle having a cooking plate and a trough along one edge of the plate for receiving grease and other liquids draining from the plate, a detachable flange for the griddle comprising an upright continuous wall arranged to be fitted to the cooking plate so as to provide depth to the griddle, whereby food stuffs can be piled upon the cooking plate to a considerable depth without danger of sliding or falling from the plate, and said wall when fitted to the plate having a loose fit with the plate at said edge so that said grease and other liquids can drain freely from said cooking plate to said trough.

CLARENCE W. SCHROEDER.